Feb. 24, 1931.  C. R. GRIFFITH  1,793,927

PULLEY

Filed May 26, 1925

Inventor

Charles R. Griffith

Attorney

Patented Feb. 24, 1931

1,793,927

UNITED STATES PATENT OFFICE

CHARLES R. GRIFFITH, OF PORTLAND, OREGON

PULLEY

Application filed May 26, 1925. Serial No. 32,960.

My invention relates to pulleys and band wheels, and has for its object the providing of the peripheral surface or rim of these with a layer of friction material of substantial thickness not affected by moisture; thereby to give the rim a better grip on the transmission belt under all working conditions.

Heretofore it has been tried to cover the rims of metal pulleys and the like with various materials in order to increase their friction hold, and among such materials cork was proposed; but the facing would not stand wear. Cork is a very suitable substance for providing a friction surface such as mentioned, but it has very little strength; while the purpose of my invention is to cover the rim of the pulley with a friction material which will last throughout the life of the pulley.

I attain my object by covering or facing the rim of a pulley, and the like, with a friction layer of substantial thickness, and composed largely of cork particles embedded in vulcanized rubber.

The details of my invention are hereinafter fully described, with reference to the accompanying drawings, in which.

Describing my invention as applied to a pulley: Preferably I use a metal pulley for the reason that it possesses great strength relative to its weight. The rim $b$ of the pulley $a$ is covered with a layer $b'$ composed of a mixture of particles of cork, rubber and pieces of cotton fibre, together with other ingredients for curing and hardening the rubber in the vulcanization thereof. The desired properties of the pulley covering are chiefly (1) friction, (2) resiliency, (3) toughness and (4) tenacity.

The proportions of the specified ingredients that I have found most efficient are:

5 lbs. 11 oz. smoke sheet rubber.
6 lbs. 11 oz. cotton fibre.
7 oz. litharge.
15 lbs. ground cork.
2 oz. lime.
6 oz. sulphur.
8 oz. gutasiack (a form of gum similar to gutta-percha but has more tenacity).

Figure 1:
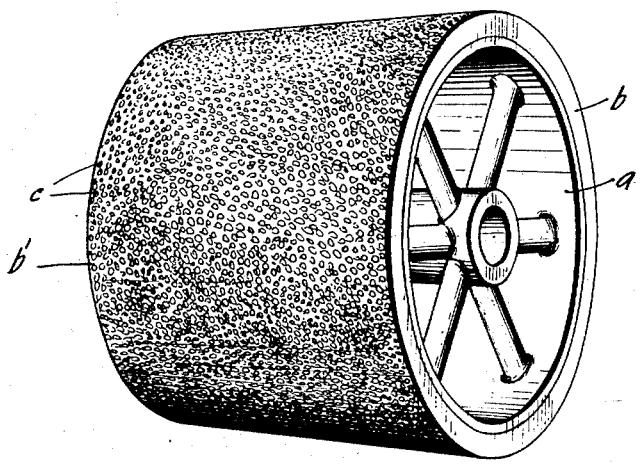
Fig. 1 is a perspective view of a pulley made in accordance with my invention.
Figure 3:
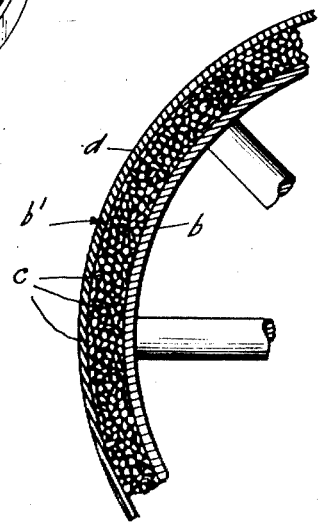
Fig. 3 is a circumferential section through said rim and said belt.
Figure 2:
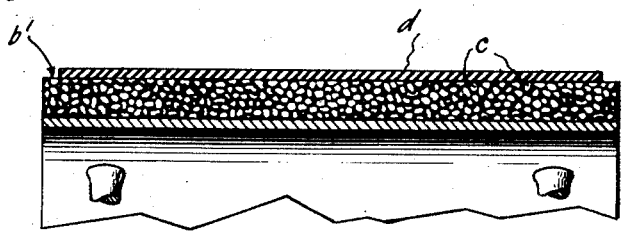
Fig. 2 is a section through the rim thereof and including a belt mounted thereon.

As will be noted from the said formula, and as diagrammatically indicated in Figs. 2 and 3 of my drawings the composition of which the layer $b'$ is made consists of a large amount of cork particles $c$; and in that way I produce an efficient friction surface adapted for engaging a transmission belt, represented by $d$ in Figs. 2 and 3.

The ingredients of the composition which I employ for facing the rim of the pulley are thoroughly intermixed, and a layer of substantial thickness of this friction material, or facing, is then applied to and vulcanized on the rim of the pulley, after which the facing is dressed down to an even surface.

The vulcanized rubber bed holding the cork particles in place sustains the latter. Since the cork particles are resilient they will yield to the pressure of the belt on the rim, and be depressed to the surface of the rubber. At the same time as my experience has shown, the cork particles tend to project beyond the face of the rim of the pulley and in this way exert an efficient frictional hold on the transmission belt.

Furthermore the cork in the said rim facing will not wear away any faster than the vulcanized rubber surface hence a uniform efficient friction surface will be maintained throughout the life of the pulley.

Since the layer of friction surface vulcanized to the rim of the pulley is of uniform transverse thickness, the belt is given an effective support and friction hold across its entire width.

My invention also is serviceable for making newspaper-press trolleys, and the friction elements—gear and disk—of friction drives and the words "and the like" in the claims are to be so understood.

I claim:

1. A power pulley and the like whose rim has vulcanized thereon a friction tread of hard rubber holding imbedded a large proportion of granular cork, distributed throughout and exceeding by weight the mass of rubber, whereby the greater portion of the peripheral surface of the rim of the pulley is composed of particles of cork firmly held encased in and protected by a non-yielding body and the frictional efficiency of the pulley is unaffected by the wear of its tread.

2. A power pulley and the like whose rim has vulcanized thereon a friction tread composed of hard rubber, cotton, gutasiack, and granular cork thoroughly intermingled substantially in the proportions stated, the granular cork exceeding by weight the combined mass of the other materials, whereby the greater portion of the peripheral surface of the rim of the pulley is composed of particles of cork firmly held encased in and protected by a non-yielding body and the frictional efficiency of the pulley is unaffected by the wear of its tread.

3. A power pulley and the like whose rim has vulcanized thereon a friction tread composed of hard rubber, cotton, litharge, lime, sulphur, gutasiack and granular cork intermingled substantially in the proportions stated, the granular cork exceeding by weight the combined mass of the other materials, whereby the greater portion of the peripheral surface of the rim of the pulley is composed of particles of cork firmly held encased in and protected by a non-yielding body and the frictional efficiency of the pulley is unaffected by the wear of its tread.

CHARLES R. GRIFFITH.